United States Patent
Bacskay

(10) Patent No.: US 7,118,300 B2
(45) Date of Patent: Oct. 10, 2006

(54) SHAFT COUPLING

(75) Inventor: Istvan Bacskay, Kristinehamn (SE)

(73) Assignee: Rolls-Royce AB, Kristinehamn (SE)

( * ) Notice: Subject to any disclaimer, the term of this patent is extended or adjusted under 35 U.S.C. 154(b) by 0 days.

(21) Appl. No.: 10/472,217

(22) PCT Filed: Mar. 22, 2002

(86) PCT No.: PCT/SE02/00575

§ 371 (c)(1),
(2), (4) Date: Sep. 22, 2003

(87) PCT Pub. No.: WO02/077477

PCT Pub. Date: Oct. 3, 2002

(65) Prior Publication Data

US 2004/0091310 A1    May 13, 2004

(30) Foreign Application Priority Data

Mar. 22, 2001    (SE) .................................... 0100998

(51) Int. Cl.
*F16D 1/02*    (2006.01)

(52) U.S. Cl. ................ 403/312; 403/296; 403/313; 403/344; 464/182

(58) Field of Classification Search .............. 403/293, 403/305, 309, 313, 344; 464/182
See application file for complete search history.

(56) References Cited

U.S. PATENT DOCUMENTS

| | | | |
|---|---|---|---|
| 2,679,414 A | | 5/1954 | Hornschuch |
| 3,554,589 A | * | 1/1971 | Boggs ......................... 403/313 |
| 3,851,983 A | * | 12/1974 | MacKenzie ................. 403/312 |
| 4,143,986 A | * | 3/1979 | Antosh ........................ 403/307 |
| 4,840,194 A | * | 6/1989 | Berry .......................... 138/155 |
| 5,746,555 A | | 5/1998 | McEvoy |
| 6,561,723 B1 | * | 5/2003 | McCurdy et al. ........... 403/312 |

FOREIGN PATENT DOCUMENTS

| | | |
|---|---|---|
| GB | 904981 | 9/1962 |
| GB | 2 177 479 | 1/1987 |

* cited by examiner

*Primary Examiner*—Daniel P. Stodola
*Assistant Examiner*—Michael P. Ferguson
(74) *Attorney, Agent, or Firm*—Browdy and Neimark, PLLC

(57) ABSTRACT

In a shaft coupling having a pair of complementally shaped, detachably joinable coupling sleeve halves (11, 12) which can be clamped together by means of clamping elements to form a split coupling sleeve provided with at least one seat (14) for a first shaft member (A1) which is to be non-rotatably connected with a second shaft member (A2, A2') so that the first and second shaft members are aligned. The sleeve halves include retaining elements for positively locking the first shaft member (A1) against rotational movement relative to the coupling sleeve, wherein the retaining elements include a plurality of elongate force transmitting elements (16D) in the seat (14, 15)

18 Claims, 4 Drawing Sheets

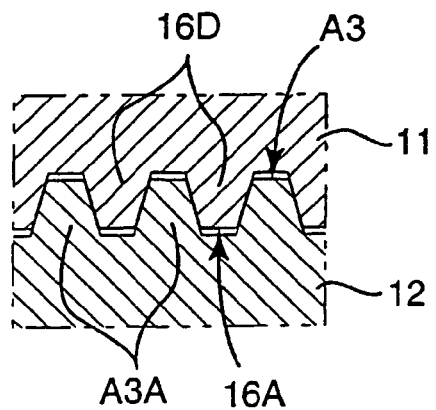
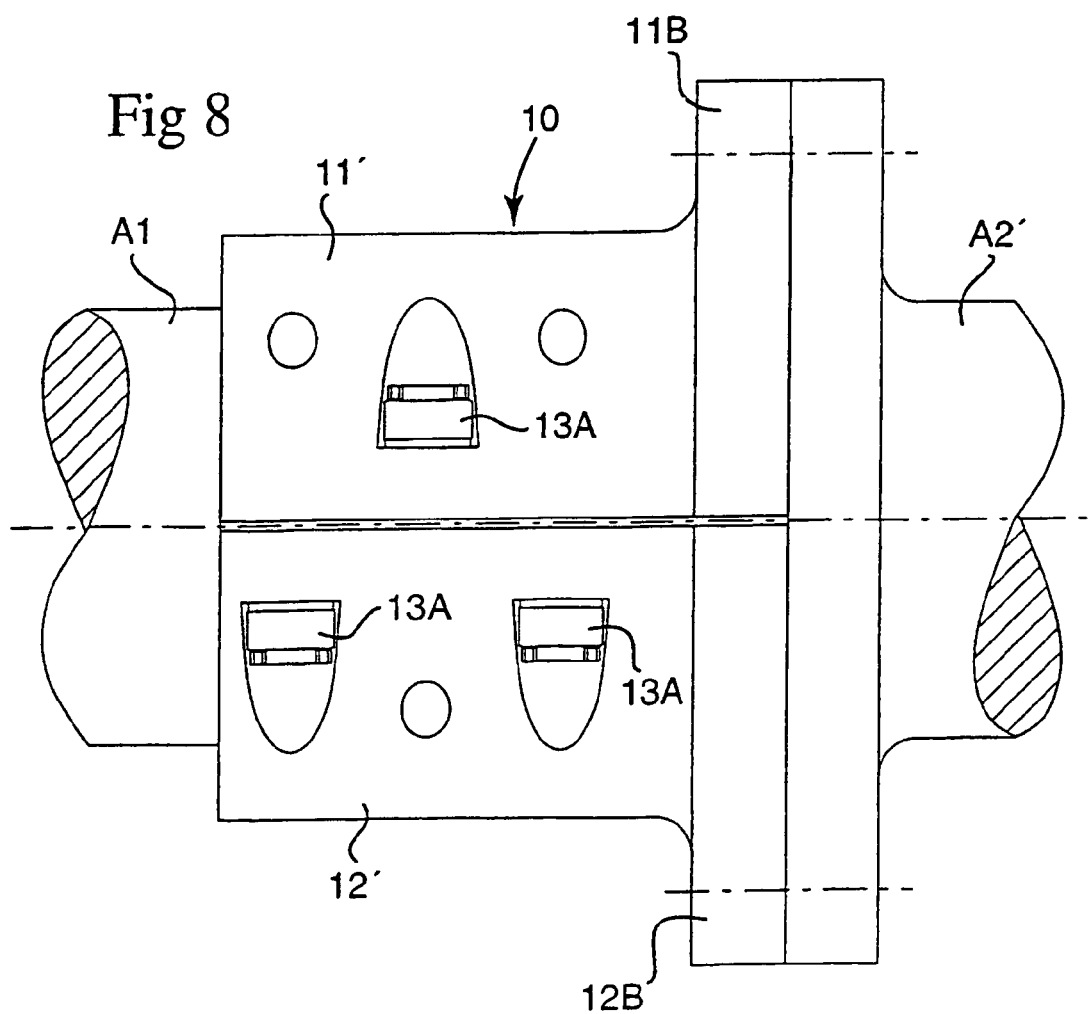

SHAFT COUPLING

BACKGROUND OF THE INVENTION

1. Technical Field of the Invention

This invention relates to a shaft coupling comprising a pair of complementally shaped, detachably joinable coupling sleeve halves which form, when they are joined together, a split coupling sleeve having an axis and provided with at least one seat for a first shaft member which is to be non-rotatably connected with a second shaft member so that the first and second shaft members are centred on said axis of the coupling sleeve, clamping elements for holding the coupling sleeve halves together and clamping them about the first shaft member, and a retaining device including interengaging retaining elements for positively locking the first shaft member against rotational movement relative to the coupling sleeve.

2. Prior Art

In known shaft couplings of this kind, also known as split clamping or compression couplings, the retaining device usually comprises a keyed joint having at least one axial key received in registering keyways in the coupling sleeve formed by the coupling sleeve halves and in the shaft member or members. The key serves as a positively locking member to prevent relative rotational movement of the coupling sleeve on the one hand and the shaft member or members on the other hand if the frictional locking of the shaft member or members to the coupling sleeve should be inadequate. Sometimes, the retaining device also comprises one or more additional retaining elements providing a positive locking of the shaft member or members to the coupling sleeve against axial movement relative to the coupling sleeve.

Split clamping couplings have several advantages. For example, they are inexpensive in comparison with many other couplings. They do not require special tools for their installation and also do not require any extra length of the shafts to enable the installation. In prior art split clamping couplings the retaining device is problematic, however.

A retaining device comprising axial keys as locking members has important disadvantages. One disadvantage is that the keyways form stress concentration areas in the coupling sleeve and in the shaft member or members and therefore limit the torque that can be transmitted.

Another disadvantage is that if the coupling and the shaft member or members have to be positively held together both rotationally and axially to be able to transmit high torques and great axial forces, a retaining device including both at least one axial key and at least one transverse key is required.

A further disadvantage is that it is often difficult to provide an adequate clamping force, that is, adequate friction between the coupling sleeve and the shaft member or members, especially in split clamping couplings which are required to transmit very high torques. As a practical matter, it is therefore necessary to rely on the retaining device for the transmission of at least a portion of the desired torque.

A disadvantage is also that the keyed joints often exhibit a certain rotational play that has undesired effects when the direction of the torque is repeatedly reversed.

Still another problem is that the contact surfaces between the coupling sleeve and the shaft member or members are prone to so-called fretting or chafing corrosion.

OBJECT AND SUMMARY OF THE INVENTION

A general object of the invention is to provide a shaft coupling, and more particularly a split clamping coupling, with an improved retaining device.

In accordance with the invention, this object is achieved by the design of the shaft coupling that is set forth in the characterising part of the independent claims.

In the shaft coupling according to the invention, the seat is thus provided with elongate force transmitting elements which form retaining elements of the retaining device and extend along a line that includes an angle with a plane perpendicular to the axis of the coupling sleeve and which are shaped so as to be interlockingly engageable with complemental force transmitting elements on the shaft member received in the seat. The force transmitting elements in the seat comprise a first group of force transmitting elements and a second group of force transmitting elements and the said angle for the first group is different from that for the second group.

Because the force transmitting elements include an angle with a plane that is perpendicular to the axis of the coupling sleeve and the angle is not the same for all force transmitting elements, the force transmitting elements can transmit forces both angularly and axially to positively lock the shaft or shaft members to the coupling sleeve such that the shaft member or members cannot turn or move axially relative to the coupling sleeve. Moreover, the force transmitting elements may be provided throughout the seat surface, or at least over a very large portion of the seat surface, so that they can jointly transmit a very high torque and a very great axial force even if their width and height are small.

In order that the available seat space may be utilized efficiently, the aforesaid angle suitably is the same for all force transmitting elements within one and the same group.

In a preferred embodiment, the force transmitting elements of each group are formed by a screw-thread, the screw-thread of one group being left-handed and the screw-thread of the other group being right-handed. The thread may have one or more inlets and suitably is a trapezoidal thread.

In this preferred embodiment, the coupling sleeve suitably is made using a full or non-split sleeve as a blank. After the screw-threads have been formed on the interior surface of the sleeve by internal threading and the required recesses, usually bolt holes, for the clamping elements have been formed, the sleeve is split in a diametrical plan so that two substantially identical coupling sleeve halves are obtained.

Regardless of whether the force transmitting elements are formed by screw-threads or other structures, it is of course necessary to ensure that the force transmitting elements of the or each shaft member fit into both groups of force transmitting elements of the associated seat in the same angular position of the shaft member relative to the coupling sleeve.

An important property of the coupling according to the invention is that it can readily be designed and dimensioned such that the positive or interlocking connection of the coupling sleeve with the shaft member or members is in itself adequate to provide the desired torque and axial-force transmission capability of the coupling, so that it will not be necessary to rely also on a frictional engagement, although a frictional engagement can be present to provide additional safety. Accordingly, it is possible, without thereby necessarily reducing the torque or axial-force transmitting capability of the coupling to a dangerous extent, to apply a surface-protective agent on the internal surfaces of the coupling sleeve halves contacting the external shaft member surfaces in order to prevent or counteract fretting of these surfaces and to facilitate mounting and dismounting of the coupling.

BRIEF DESCRIPTION OF THE DRAWINGS

The invention will be described in greater detail below with reference to the accompanying drawings which show a preferred exemplary embodiment.

FIG. 7 is a sectional view on line VII—VII of FIG. 5; and

FIG. 8 shows a modification of the coupling of FIG. 1.

DETAILED DESCRIPTION OF THE PREFERRED EMBODIMENT(S) OF THE INVENTION

Figure 1:
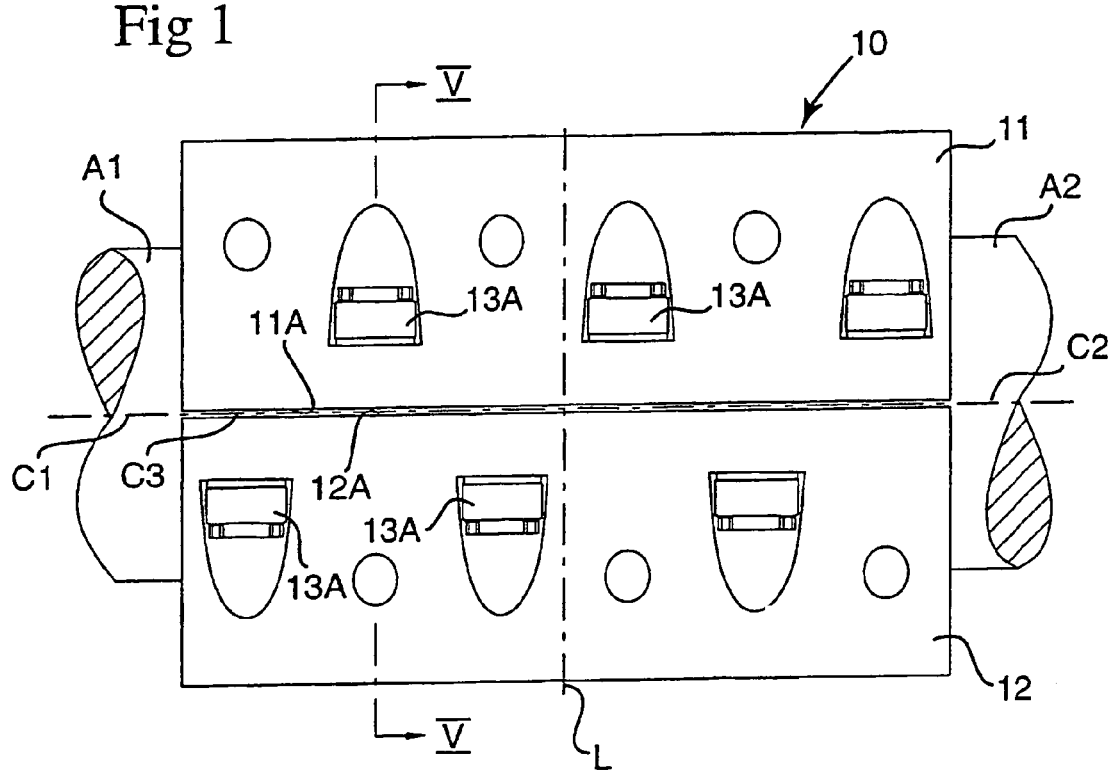
FIG. 1 is a side view of a shaft coupling embodying the invention, the coupling being mounted on two shaft members to interconnect them rigidly.
Figure 2:
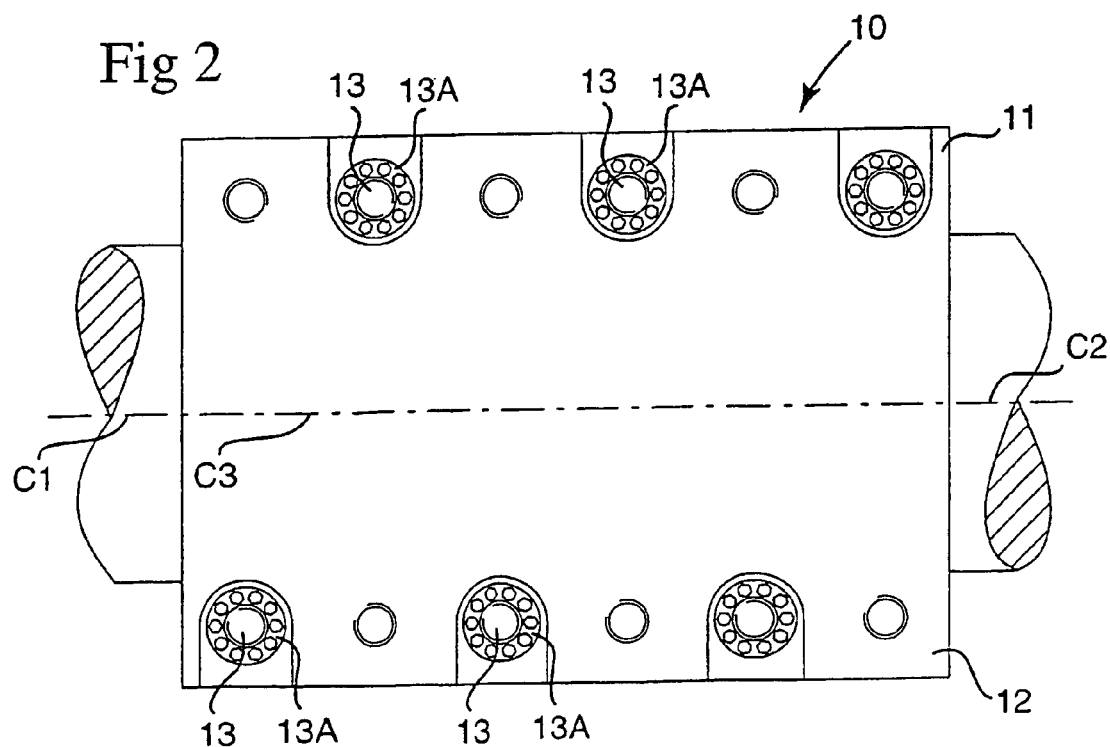
FIG. 2 is a plan view of the coupling shown in FIG. 1.
Figure 3:
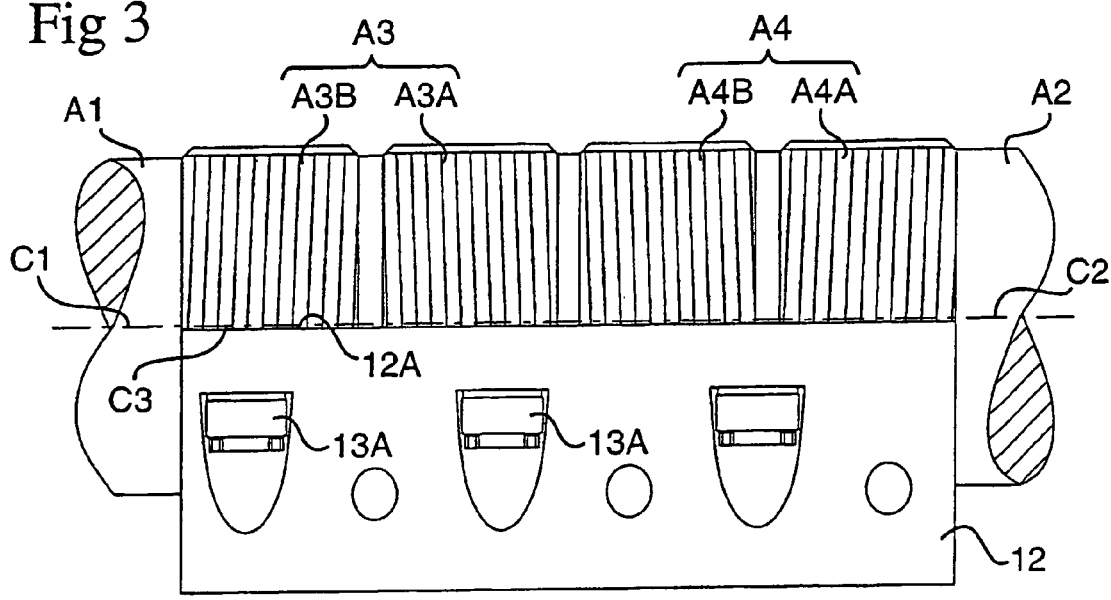
FIG. 3 is a side view similar to FIG. 1 but shows the coupling with the upper coupling sleeve halve removed.
Figure 4:
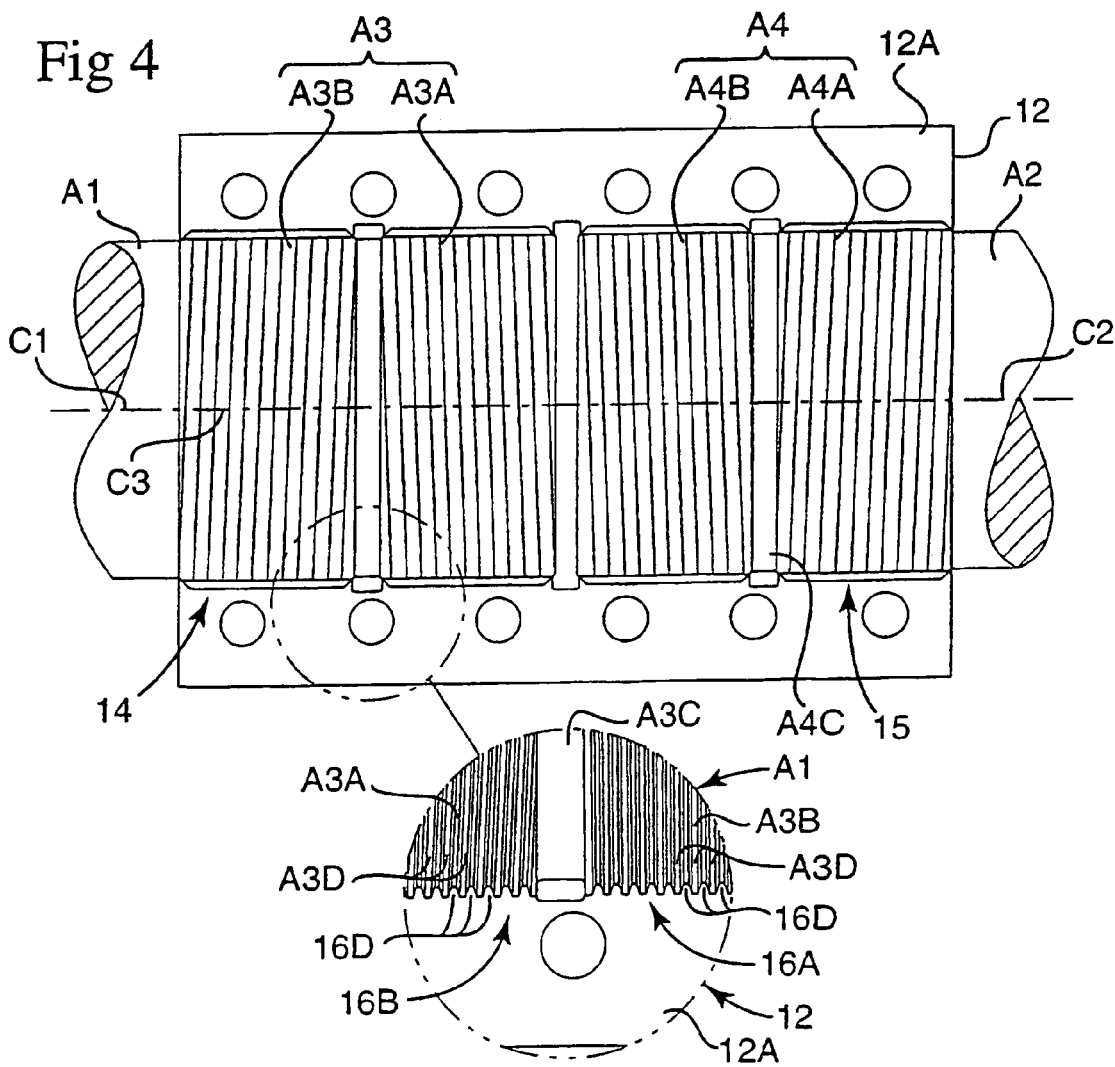
FIG. 4 is a plan view corresponding to FIG. 3.
Figure 5:
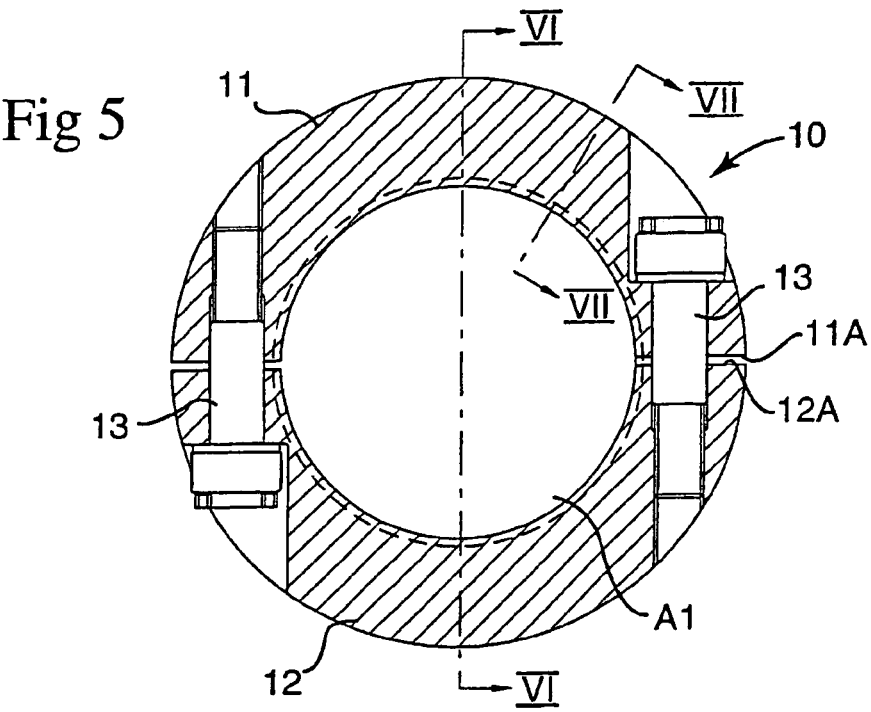
FIG. 5 is a cross-sectional view of the coupling taken on line V—V of FIG. 1, the shaft member intersected by the sectional plane being shown in an end view.

The shaft coupling shown by way of example in FIGS. 1 to 7 is generally designated by 10. The shaft coupling 10 is intended for holding together two shaft members A1 and A2 which are aligned with their confronting ends close to one another.

The coupling 10 comprises two substantially identical coupling sleeve halves 11 and 12, which are "diagonal" mirror-image or reverse copies of one another, and a number of clamping elements formed by bolts 13 which hold the coupling sleeve halves together and clamp them about the shaft members A1 and A2 with the axes C1 and C2 of the latter substantially coinciding with the axis C3 of the coupling sleeve.

When the coupling sleeve halves 11, 12 are clamped together as shown in the drawings, they jointly form a circular cylindrical coupling sleeve which is concentric with and surrounds and firmly interconnects the shaft members A1, A2. As is well known in the art of split clamp couplings, the dimensions of the coupling sleeve halves should be related to the dimensions of the shaft members A1, A2 such that there is at least some open space between the confronting faces 11A, 12A of the coupling sleeve halves, even when these are firmly clamped together, see especially FIG. 5.

The interior side of the coupling sleeve formed by the coupling sleeve halves 11, 12 has two axially aligned seats 14, 15 which are generally cylindrical and form mounts for receiving the end portions of the aligned shaft members A1 and A2.

The surface of the seats 14 and 15 is not completely smooth in that it is provided with an internal screw-thread 16 and 17, respectively, which is complemental to and accordingly fits in an external screw-thread A3 and A4, respectively, on the shaft members A1 and A2. In the illustrated embodiment the screw-threads are trapeoidal or acme screw-threads, see FIG. 7. Suitably, the screw-threads are standard screw-threads.

In each seat 14, 15 the screw-thread 16 and 17, respectively, is divided into two thread sections 16A, 16B and 17A, 17B, respectively, which are separated by a small gap 16C and 17C, respectively. In the inner thread section 16A, 17A the thread 16, 17 is a right-hand thread whereas the other or outer thread section 16B, 17B is a left-hand thread. Disregarding the opposite directions of hand, the screw-threads in the two thread sections in each seat 14, 15 are similar in the illustrated embodiment, but they may alternatively be dissimilar within the scope of the invention.

Correspondingly, the screw-thread A2 and A4 on the shaft members A1 and A2, respectively, is divided into two thread sections A3A, A3B and A4A, A4B, respectively, with opposite directions of hand.

Figure 6:
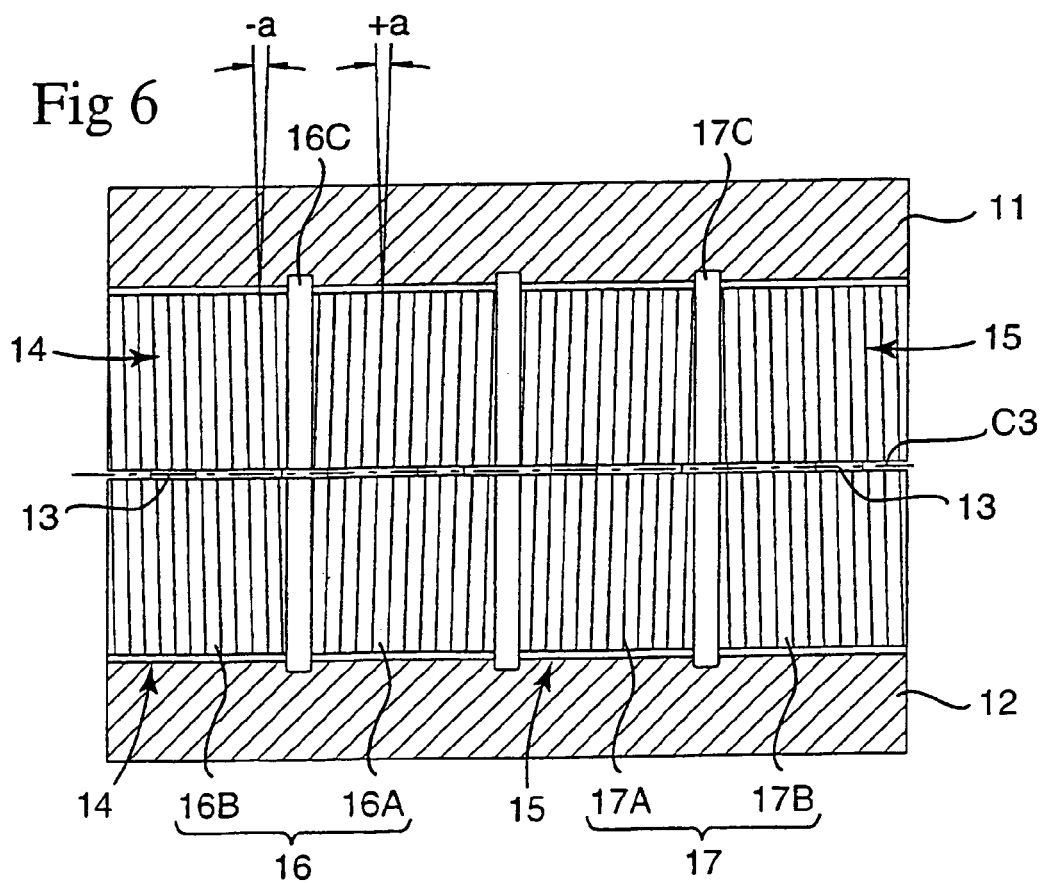
FIG. 6 is a diametrical sectional view on line VI—VI of FIG. 5, the shaft members interconnected by the coupling sleeve being omitted.

In each seat 14, 15 the screw-thread of each thread section forms a plurality of elongate retaining members which extend along a cylindrical helical line, that is, an inclined line that includes angle, equal to the pitch angle of the screw-thread, with a plane perpendicular to the axis C3 of the coupling sleeve, such as the plane L in FIG. 1. This angle is indicated in FIG. 6 for a retaining element in each of the thread sections 16A and 16B and designated by +a and −a, respectively, where the plus and minus signs indicate respectively a right-handed thread and a left-handed thread. Each retaining element is formed by the segment of the screw-thread ridge which extends between the faces 11A, 12A of the coupling sleeve halves 11, 12. In the circled enlarged part of FIG. 4 and in FIG. 7 the retaining elements of the thread sections 16A, 16B, that is, in the seat 14 for the shaft member A1, are designated by 16D.

The retaining elements in the seats 14, 15 are force transmitting elements which are adapted to coact with complemental retaining elements, likewise serving as force transmitting elements, on the section of the shaft member 14, 15 received in the respective seat to transmit torque and axial forces between the shaft member received in the seat and the coupling sleeve.

The complemental retaining elements are formed by the ridge of the screw-threads A3 and A4 of the shaft members A1 and A2. Each complemetal retaining element is formed by the segment of the continuous ridge of the screw-threads A3 and A4 with which a retaining element in the seat 14, 15 is in engagement when the coupling sleeve halves are clamped about the shaft members A1, A2. Accordingly, each retaining element of the shaft members corresponds to one-half of a full turn of the screw-thread. In the enlarged portion of FIG. 4 and in FIG. 7 the retaining elements on the shaft member A1 are designated by A3D.

As shown in FIG. 7, the screw-threads of the illustrated exemplary embodiment have a trapezoidal profile. This profile advantageously is a standardized profile, such as a standard profile the profile angle of which is 30°, and the flank angle of which thus is 15°. Since a certain gap between the crest of one of the threads and the bottom of the other thread is always present and the coupling sleeve halves 11, 12 do not subtend a full half-circle, the coupling sleeve halves will always be engaged and connected in play-free manner with the shaft members A1, A2 when they are clamped about them.

The flank angle also results in the clamping force applied by the bolts 13 providing a firm wedging action and thereby a great axial force between the screw-thread ridges engaging one another. As a result, the coupling sleeve formed by the coupling sleeve halves 11, 12 provides a firm interconnection of the shaft members both in the circumferential and in the axial direction. At the same time, the forces to be transmitted between the coupling sleeve and the shaft members are distributed over a large surface without the thread profile having to be deep, and the torque and the axial force to be transmitted by the coupling between the shaft members are properly distributed throughout the coupling. This means that the material of the coupling sleeve halves will be utilized efficiently so that the outer diameter of the coupling sleeve can be minimized.

In the embodiment shown by way of example, which is designed for large-diameter shaft members, such as ship propeller shafts, the bolts 13 holding and clamping the coupling sleeve halves 11, 12 together are stud bolts one end of which is screwed into one of the coupling sleeve halves. They are provided with a nut 13A supported on the other of the coupling sleeve halves through the intermediary of a washer.

The nut 13A is a nut of the kind which is marketed under the trade mark Superbolt® and is described in, for example, GB-2 156 935. When the clamping is carried out, the nut 13A is screwed onto the stud bolt 13 in the conventional manner until it engages its seat in the associated one of the coupling sleeve halves 11, 12. Then the stud bolt is tensioned by means of, for example, 8 or 12 smaller screws which are positioned along a circle adjacent to the circumference of the nut 13A and extend axially through the nut. Through the washer the screws are supported on the seat surface of the coupling sleeve half. These smaller screws are formed with a hexagonal socket for a screw-driving tool. Using a nut of this kind, it is possible to tension the stud bolt sufficiently without it being ncessary to use cumbersome and heavy tools. This is important when the coupling has to be mounted in places which are confined and difficult to reach.

The shaft coupling 10' shown in FIG. 8 is modified relative to the coupling shown in FIGS. 1 to 8 only insofar as the half of each coupling sleeve half situated to the right of the phantom line L in FIG. 1 is replaced with a semi-circular flange 11B, 12B provided with bolt holes so that the coupling sleeve halves 11', 12' can be bolted to a circular flange on a shaft member A2'.

The invention claimed is:

1. A shaft coupling comprising:
a pair of complementally shaped, detachably joinable coupling sleeve halves (11, 12) which form, when they are joined together, a split coupling sleeve having an axis (C3) and provided with at least one seat (14) for a first shaft member (A1) which is to be non-rotatably connected with a second shaft member (A2, A2') so that the first and second shaft members are centered on said axis of the coupling sleeve, said seat extending about said axis of the coupling sleeve,
clamping elements (13) for holding the coupling sleeve halves (11, 12) together and clamping them about the first shaft member (A1), and
a retaining device (16/A3) including interengaging retaining elements for positively locking the first shaft member against rotational movement relative to the coupling sleeve,
characterised in that:
the coupling sleeve halves (11, 12) include in said seat (14, 15) a plurality of elongate force transmitting elements (16D) which form said retaining elements and extend along a line including an angle (+a, −a) with a plane (L) perpendicular to said axis (C3) of the coupling sleeve and which are shaped so as to be interlockingly engageable with complemental force transmitting elements (A3D) on the first shaft member (A1), said force transmitting elements in said seat comprising a first group (16A) and a second group (16B) of said force transmitting elements (16D), said angle (+a, −a) in the first group being in a different direction from that in the second group, and
wherein said first group and said second group of said force transmitting elements are spaced apart along said axis (C3) to create an annular gap free of any said force transmitting elements.

2. A shaft coupling as claimed in claim 1, characterised in that within each of said groups (16A, 16B) said angle (+a, −a) is the same absolute value for all force transmitting elements (16D).

3. A shaft coupling as claimed in claim 2, characterised in that said angle (+a) for the first of said groups (16A) of force transmitting elements (16D) is of the same absolute value as said angle (−a) for the second of said groups (16B) of force transmitting elements (16D) but of a different direction.

4. A shaft coupling as claimed in any one of claims 1 to 3, characterised in that said first group (16A) of said force transmitting elements (16D) and said second group (16D) of said force transmitting elements (16D) are mirror-image copies of one another.

5. A shaft coupling as claimed in claim 1, characterised in that said line along which said force transmitting elements (16D) in said seat extend is a helical line or a part of a helical line.

6. A shaft coupling as claimed in claim 1, characterised in that said force transmitting elements (16D) in said seat are formed by ridges on the seat surface.

7. A shaft coupling as claimed in claim 1, characterised in that said force transmitting elements (16D) in said seat comprise screw-thread sections (16,17).

8. A shaft coupling as claimed in claim 7, characterised in that the screw thread sections (16, 17) are sections of a trapezoidal screw-thread.

9. A shaft coupling as claimed in claim 7, characterised in that the screw-thread has a plurality of inlets.

10. A shaft coupling as claimed in claim 1, characterised in that the coupling sleeve comprises, in addition to the seat (14) for the first shaft member (A1), a second seat (15) for the second shaft member (A2), said second seat being spaced from said seat (14) for the first shaft member along said axis (C3).

11. A shaft coupling as claimed in claim 1, characterised in that the coupling sleeve comprises a single seat (14) for a shaft member (A1, A2), namely said seat for the first shaft member (A1), and a flange (11B) for connecting the coupling sleeve to the second shaft member (A2'), said flange being spaced from said seat along said axis.

12. A shaft connection assembly comprising a first shaft member (A1), a second shaft member (A2, A2') and a shaft coupling (10) for an axially and rotationally rigid interconnection of said first and second shaft members with the first and second shaft members aligned with one another, wherein said shaft coupling comprises:
a pair of complementally shaped, detachably joinable coupling sleeve halves (11, 12) which form, when they are joined together, a split coupling sleeve having a mount or mounts (14, 11B, 12B) for the shaft members, said mount or mounts comprising at least one seat (14) for the first shaft member (A1), said seat extending about an axis of the coupling sleeve,
clamping elements (13) for holding the coupling sleeve halves (11, 12) together and clamping them about the first shaft member (A1), and a retaining device (16/A3) including interengaging retaining elements for positively locking the first shaft member (A1) against rotational movement relative to the coupling sleeve, characterised in that:

the coupling sleeve halves (11, 12) include in said seat (14, 15) a plurality of elongate force transmitting elements (16D) which form said retaining elements and extend along a line including an angle (+a, −a) with a plane (L) perpendicular to said axis (C3) of the coupling sleeve, at least one of said shaft members (A1) comprises force transmitting elements (A3D) which are complemental to said force transmitting elements (16D) in said seat (14) and adapted to be in interlocking engagement with said force transmitting elements (16D) in said seat (14), both said force transmitting elements in said seat (14) and said force transmitting elements on said one shaft member (A1) comprising a first group (16A, A3A) of said force transmitting elements and a second group (16B, A3B) of said force transmitting elements, and said angle (+a, −a) for said first group being in a different direction from that for said second group, and wherein said first group and said second group of said force transmitting elements are spaced apart along said axis (C3) to create an annular gap free of any said force transmitting elements.

13. A shaft connection assembly as claimed in 12, characterised in that within each of said groups (16A, 16B), the said angle (+a, −a) is the same absolute value for all force transmitting elements (16D).

14. A shaft connection assembly as claimed in claim 13, characterised in that said first group (16A) of said force transmitting elements (16D) and said second group (16B) of said force transmitting elements (16D) are mirror-image copies of one another.

15. A shaft connection assembly as claimed in claim 12, characterised in that said force transmitting elements (16D) in said seat comprise screw-thread sections (16, 17).

16. A shaft connection assembly as claimed in claim 12, characterised in that the coupling sleeve comprises, in addition to said seat (14) for the first shaft member (A1), a second seat (15) for the second shaft member (A2), said second seat being spaced from said seat for the first shaft member.

17. A shaft connection assembly as claimed in claim 16, characterised in that said mount or mounts of the coupling sleeve comprise a single seat (14) for a shaft member, namely said seat for the first shaft member (A1), and a flange (11B) for connecting the coupling sleeve to the second shaft member (A2'), said flange being spaced from said seat.

18. A shaft coupling comprising:

a pair of complementally shaped, detachably joinable coupling sleeve halves (11, 12) which form, when they are joined together, a split coupling sleeve having an axis (C3) and provided with at least one seat (14) for a first shaft member (A1) which is to be non-rotatably connected with a second shaft member (A2, A2') so that the first and second shaft members are centered on said axis of the coupling sleeve, said seat extending about said axis of the coupling sleeve, clamping elements (13) for holding the coupling sleeve halves (11, 12) together and clamping them about the first shaft member (A1), and a retaining device (16/A3) including interengaging retaining elements for positively locking the first shaft member against rotational movement relative to the coupling sleeve, characterised in that:

each of the coupling sleeve halves (11, 12) include in said seat (14, 15) a plurality of elongated force transmitting elements (16D) which form said retaining elements, wherein each of said retaining elements is formed along a single arc extending between opposite longitudinal edges of each of the coupling sleeve halves and have an angle (+a, −a) with a plane (L) perpendicular to said axis (C3) of the coupling sleeve and are shaped so as to be interlockingly engageable with complemental force transmitting elements (A3D) on the first shaft member (A1), said force transmitting elements in said seat comprising a first group (16A) and a second group (16B) of said force transmitting elements (16D), said angle (+a, −a) in the first group being in a different direction from that in the second group, and wherein said first group and said second group of said force transmitting elements are spaced apart along said axis (C3) to create an annular gap free of any said force transmitting elements.

* * * * *